G. H. BARRUS.
METER FOR STEAM, AIR, OR OTHER GASES.
APPLICATION FILED DEC. 21, 1914.

1,217,899.

Patented Mar. 6, 1917.

Witnesses:
Hugo Centervall
A. J. Miller

Inventor
George H. Barrus
By his Attorney
W. B. Morton.

UNITED STATES PATENT OFFICE.

GEORGE HALE BARRUS, OF BROOKLINE, MASSACHUSETTS.

METER FOR STEAM, AIR, OR OTHER GASES.

1,217,899.　　　　　Specification of Letters Patent.　　Patented Mar. 6, 1917.

Application filed December 21, 1914. Serial No. 878,225.

*To all whom it may concern:*

Be it known that I, GEORGE HALE BARRUS, a citizen of the United States, residing at Brookline, in the county of Norfolk and State of Massachusetts, have invented a new and useful Improvement in Meters for Steam, Air, or other Gases, of which the following is a specification.

My invention relates to improvements in meters for steam, air or other gases.

The object of my invention is to provide means for extending the range of meters of the type in which the amount of gas passing through a pipe is determined by measuring the difference in pressure between the gas on opposite sides of a constricted passage placed in the line of pipe through which the gas is passed; such for example as the meters shown in my Patent #1,047,911 of December 24, 1912. It is well known that the range of such a meter can be changed by changing the size of the constricted passage through which the gas is passed, but this requires less simple and more expensive devices than those which I employ in carrying out the invention shown and described in this specification and the accompanying drawings and clearly defined in the claims.

Referring now to the drawings.

Figure 1:
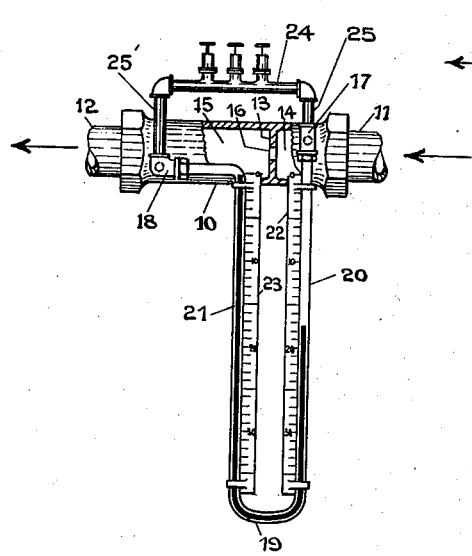
Figure 1 is a side elevation partly in section of one form of apparatus embodying my invention.

In Fig. 1, which shows a general form of manometer used for measuring the flow of gases, to which have been added the devices which cause it to constitute one form of apparatus embodying my invention, the numeral 10 indicates a pipe fitting hereinafter referred to as a diaphragm coupling which connects the two pipes 11 and 12 through which a gas, such as steam or air, flows in the direction of the arrows and the quantity of flow of which per unit of time it is desired to measure. Located within the said diaphragm coupling 10 is a diaphragm 13, formed integrally therewith or in any other suitable manner, the said diaphragm dividing the interior into two chambers 14 and 15 which are connected together through the orifice 16 in the said diaphragm. The orifice 16 is smaller than the bore of the pipes 11 and 12 so that the gas in passing therethrough is throttled, thus causing a difference in pressure at the opposite sides of the diaphragm. The relative size of the orifice 16 and the bore of the pipes 11 and 12 determines what the difference in pressure will be between the two chambers 14 and 15 for a certain rate of flow of gas at a certain pressure. Connected to the chambers 14 and 15 by the special fittings 17 and 18 respectively is a transparent manometer tube 19 embodying two legs 20 and 21 joined at their lower ends to form a U, the upper end of the leg 21 being bent horizontally to connect to the fitting 18. Suitably fastened to the legs 20 and 21 are similarly graduated scales 22 and 23 respectively, their corresponding points being at the same level and the graduations being in accordance with a predetermined unit of measurement. If a liquid be placed, or allowed to condense from the gas, so that it extends up into each leg of the manometer tube, the difference in level of the liquid in the two legs, multiplied by the specific gravity of the liquid, will measure the difference in pressure between the gas in the two chambers 14 and 15 in terms of height of water column, and thus, by the use of well known conversion factors, in terms of units of pressure per unit of area. With the difference in pressure thus determined it is possible by the use of well known tables and formulæ to calculate the quantity of gas flowing through the orifice of the diaphragm per unit of time. However, I prefer in calibrating a meter for measuring steam to pass steam through it at several different rates, and by condensing the steam thus passed and weighing it, thus determine the calibration of the differential pressure gage.

In the use of such meters I have frequently found it difficult to determine without preliminary test just what size of orifice in the diaphragm coupling was required to insure that the difference in pressure in the two chambers would certainly be within the range of the differential pressure gage I wished to use on the meter. I have also frequently found such irregularities in the use of the gases which were being measured that whereas at certain times the usual length of manometric tube was sufficient for measuring the differences in pressure on the two sides of the orifice diaphragm, yet at other times the difference would be so great that it was necessary to either change the size of the orifice and thus lessen the difference in pressure or substitute a longer and therefore less easily handled and more costly and fragile manometer tube. The employment of two or more diaphragms with a different size of orifice in them, with means for moving one or more of these diaphragms into and out of the passage through the diaphragm coupling is a well known means for enabling a certain size of manometer to measure through quite a wide range the quantity of gas supplied per unit of time and is shown and described in my patent above referred to. However, the addition of such movable diaphragms to the diaphragm coupling is quite expensive, especially where the pipes carrying the gas are quite large. I have therefore devised means which I will now describe for greatly extending the range of a given size of manometer without the use of such multiple orifice diaphragm couplings.

Figure 3:
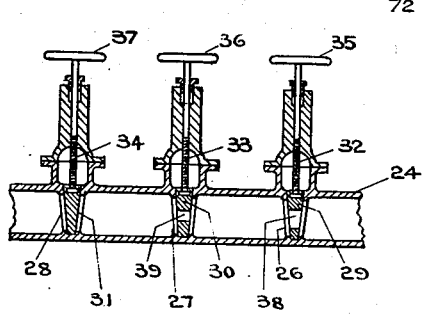
Figs. 3 and 4 are enlarged views of portions of Figs. 1 and 2 respectively showing more clearly, as hereinafter pointed out, certain of the details of the apparatus.

Referring to Figs. 1 and 3, the horizontal pipe 24 embodying the gate valve seats 26, 27 and 28, is connected by the vertical pipes 25 and 25' to the fittings 17 and 18 and thus forms a bypass or shortcircuiting passage between the two ends of the manometer tube 19. Coacting with the valve seats 26, 27 and 28 are valve gates 29, 30 and 31 respectively which by means of their respective stems 32, 33 and 34 and handles 35, 36 and 37 may be opened or closed in the usual manner. Formed in the gate 29 is an orifice 38 smaller than the bore of the pipe 24 and similarly formed in the gate 30 is an orifice 39 smaller than the orifice 38. It will be readily seen that when the gate 31 which has no orifice in it closes the pipe 24, the manometer will be in the same condition and give the same indications under similar differences of pressure in the diaphragm coupling that it would under the condition previously described. However, if the gate 31 be fully opened and the gate 30 be closed the orifice 39 therein will give an opening through the shortcircuiting passage and thus cause the difference in pressure between the two ends of the manometer tube to be less than the difference in pressure between the two chambers of the diaphragm coupling. Similarly by opening both of the gates 30 and 31 and leaving the gate 29 closed, the orifice 38 in the gate 29 will give a still larger opening through the shortcircuiting passage and consequently there will be still less difference in pressure between the two ends of the manometer than between the two chambers of the diaphragm coupling. By making suitable calibration tests it becomes a simple matter to determine the proper constants to use when employing each of the different sizes of orifice in the shortcircuiting passage. It is thus seen that by suitably varying the size of the opening in the shortcircuiting passage a given size of manometer can be utilized to measure a very extended range of difference in pressure between the two chambers of a diaphragm coupling having a fixed size of orifice. It is to be noted that in general it is best to use the smallest orifice in the shortcircuiting passage that will permit the difference in pressure to be measured as variations in the difference in height of the liquid columns in the manometer tube for variations in difference in pressure in the two chambers of the diaphragm coupling will thus be greatest and therefore more accurately determinable.

Figure 2:
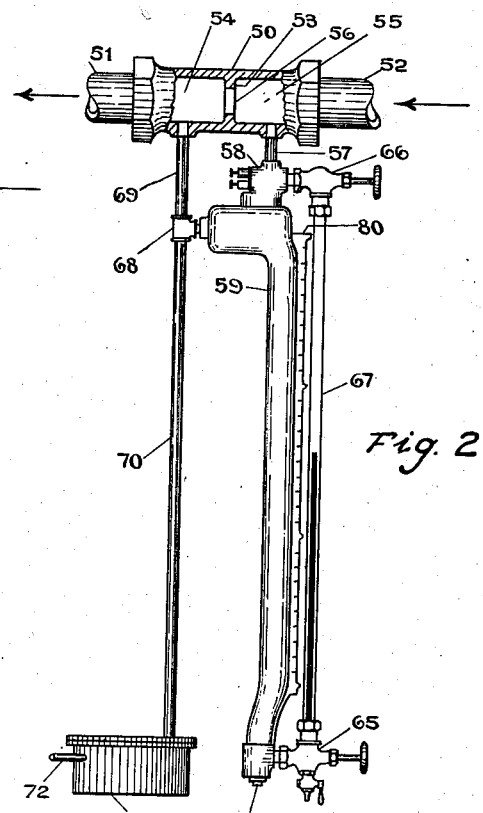
Fig. 2 is a side elevation partly in section of another form.
Figure 4:
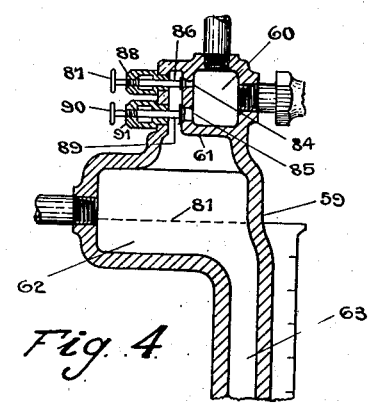

In Figs. 2 and 4 I have shown a form of my invention embodying the use of a shortcircuiting passage in a manometer, of the type shown and described in my patent above referred to, in which the column of liquid for the manometer is wholly supplied by condensation of the gas, such as steam, in the manometer, with a reservoir at the top of the low pressure leg of the manometer for holding a surplus quantity of condensed liquid.

In this form of apparatus, 50 indicates the diaphragm coupling joining together the two pipes 51 and 52 through which the gas which is to be measured is passed. The diaphragm 53 separates the interior of the coupling into two chambers 54 and 55 which are connected together by the orifice 56 in the diaphragm. Suspended below the coupling 50 to which it is connected by the pipe 57 is a manometer 58 which comprises two main portions; a body 59 and a gage glass 67. In the upper end of the body 59 is a chamber 60 which is connected through the pipe 57 with the chamber 55 of the coupling 50. The chamber 60 is separated by the wall 61 from the other portion of the interior of the body 59. The body 59 is expanded out just below the chamber 60 into a still larger chamber 62, and below this chamber 62 the body is continued downward in the form of a hollow log, the passage 63 in this leg being connected at its upper end to the chamber 62 and being closed at its bottom end by the plug 64. Connected to the passage 63 near the bottom is a gage glass fitting 65 of conventional type, and connected to the chamber 60 above described is another gage glass fitting 66 of a conventional type. The gage glass 67 connects the two gage glass fittings 65 and 66. Connected to the left hand side of the chamber 62 is a pipe T 68, which, by means of the pipe 69, connects the said chamber 62 with the chamber 54 in the diaphragm coupling. The T 68 is also connected by the pipe 70 to a receptacle or trap 71 which, by means of the pipe 72 may be connected to a reservoir or any desired point of discharge. Formed on the right hand side of the manometer body 59 is a rib 80 on which are formed suitable calibration marks and projections as shown. Where space permits, the manometer may be placed alongside of the diaphragm coupling instead of below it, as shown in Fig. 2, thereby dispensing with the discharge receptacle 71, the chamber 62 discharging directly into the low pressure chamber of the diaphragm coupling as in the construction shown in Fig. 1. This apparatus as thus described constitutes a commercial form of the improved meter covered in my Letters Patent #1,047,911 above referred to, its operation being as follows:

When gases, such as steam, which condense when coming into contact with objects at ordinary temperatures, are passed through the pipes 51 and 52 in the direction of the arrows, the manometer soon becomes filled with liquid condensed from the gas and this liquid stands in the chamber 62 to the level indicated by the dotted line 81, which is at the height of the bottom of the passage connecting the T 68 with the chamber 62. The liquid in the gage glass 67 does not stand as high as in the chamber 62 since when any gas is passing through the pipes 51 and 52 the pressure is higher in the chamber 55 than in the chamber 54 of the diaphragm coupling 50, owing to the throttling effect of the diaphragm 53, and this difference in pressure forces the liquid in the gage glass 67 down until the difference in height between it and that in the chamber 62 multiplied by the specific gravity of the liquid is equal to the said difference in pressure. The top edge of the fin 80 is made to come just in line with the drainage level of the chamber 62, which is taken as the zero reading since the area of a horizontal section of the chamber 62 is so large compared to the area of the bore of the gage glass 67 that there can be no appreciable change in the level of the liquid in the chamber 62 on account of variations in height of the liquid column in the gage glass. Consequently the difference in height of the liquid columns may be read off by the graduations already described, formed on the fin 80. With proper data as to the physical characteristics of the gas which is being measured, and with the difference in pressure between the chambers 54 and 55 determined as just described, it becomes a simple matter to calculate, by well known formulæ, the amount of gas passed per unit of time through the said pipes 51 and 52. However, as previously stated, I prefer, especially where the meter is to be used for measuring steam to calibrate the instrument by actual tests.

It is readily seen that with a given diaphragm coupling the above described instrument will measure the difference in pressure between the two chambers 54 and 55 so long as this pressure does not exceed the height of the column which may be seen in the gage glass 67. In order to extend the range of this form of manometer without increasing the length of the gage glass, I provide bypass or short-circuiting passages 84 and 85 formed in the vertical portion of the wall 61 which separates the chamber 60 from the chamber 62. In order to be able to close or open at will the small shortcircuiting passage 84 when desired, I provide the valve 86 which, by means of the handle 87 and gland 88, may be screwed in or out, thus closing or opening the said passage 84. Similarly, the valve 89, by means of the handle 90 and gland 91, is provided for closing or opening the larger shortcircuiting passage 85. It is readily seen that with the smaller passage 84 open, the difference in pressure between the manometer chambers 60 and 62 will be less than the difference in pressure between the diaphragm chambers 55 and 54, and that the amount of this difference between the two differences in pressure will be a function of the size of the passage 84. Similarly, the difference in pressure between the manometer chambers 60 and 62 will be still less compared to that between the diaphragm coupling chambers 55 and 54 when the larger shortcircuiting passage 85 is open than when the passage 84 is open. This difference in pressure will be still further reduced when both the passages 85 and 84 are simultaneously open. By making proper tests of the manometer under the four different conditions; namely, first, with no shortcircuiting passage open between the chambers 60 and 62; second, with the small passage open; third, with the larger passage open; and fourth, with both the larger and the smaller passages simultaneously open, proper calibration curves can be determined so that the single instrument may be used to measure several times the amount of difference in pressure between the diaphragm chambers 55 and 54 that it otherwise could. This is more clearly seen by noting that by properly proportioning the shortcircuiting passages 84 and 85, the difference in pressure between the chambers 55 and 54 which it would require the full length of the calibrated scale on the rib 80 to measure when the shortcircuiting passages are all closed, might be measured by the first small division when the passage 84 is open. Also, that such a pressure which, when the valve 84 is open, would force the liquid column down to the full range of the scale, might be made to force it only to the first division when the passage 85 was open and the passage 84 closed. Similarly with both passages open, a small portion of the scale might be made to indicate as much difference in pressure as the entire length of the scale where only the passage 85 was open. In this way the range of the instrument may, by the use of only two shortcircuiting passages, be increased to nearly four times the capacity of the instrument without such passage. It is thus readily seen that my improved form of meter may, with the use of a single size of orifice in the diaphragm of the diaphragm coupling, be used for measuring the quantity of flow of gases through a very wide range.

It is to be noted that I have used the terms "gas" and "gases" in their broadest sense as including all fluids which are highly compressible as distinguished from liquids which are highly incompressible.

Claims:

1. A meter for gases comprising a chamber, a diaphragm with a permanently open orifice therein in said chamber through which the gases pass, a differential pressure gage having connections to the said chamber on each side of the said diaphragm, and a shortcircuiting passage of predetermined effect between the said connections adapted to be open in parallel with the passage through said chamber during the operation of the meter.

2. A meter for gases comprising a chamber, a diaphragm in said chamber, a permanently open orifice in said diaphragm through which the gases pass, a differential pressure gage having connections to the said chamber on each side of the said diaphragm, and a shortcircuiting passage of predetermined effect between the said connections adapted to be open in parallel with the passage through said chamber during the operation of the meter exterior to the said chamber.

3. A meter for gases comprising a chamber, an orifice therein smaller than the said chamber and through which the gases pass, a differential pressure gage having connections to the said chamber near to and on each side of the said orifice, a shortcircuiting passage of predetermined effect between the said connections adapted to be open in parallel with the passage through said chamber during the operation of the meter and means for varying by predetermined degrees the shortcircuiting effect of said shortcircuiting passage.

4. A meter for gases comprising a chamber, a permanently open orifice therein smaller than the said chamber and through which the gases pass, a differential pressure gage having connections to the said chamber near to and on each side of the said orifice, and a shortcircuiting passage of predetermined effect between the said connections with means operatable during the action of said meter for opening and closing the said shortcircuiting passage.

5. A meter for gases comprising a chamber, an orifice therein smaller than the said chamber and through which the gases pass, a differential pressure gage having connections to said chamber on each side of the said orifice, a short-circuiting passage of predetermined effect between the opposite sides of said chamber, and means for opening and closing the said short-circuiting passage and varying in predetermined degrees the short-circuiting effect of said passage.

6. A meter for gases comprising a chamber, an orifice therein smaller than the said chamber and through which the gases pass, a differential pressure gage having connections to the said chamber near to and on each side of the said orifice for measuring the difference in pressure between the gases on the opposite sides of the said orifice, and means for causing the pressure difference acting on the said differential gage to be a predetermined fraction of the said difference in pressure between the gases on the opposite sides of the said orifice.

7. A meter for gases comprising a chamber, an orifice therein through which the gases pass, said orifice being smaller than the said chamber for causing a difference in pressure in the gases on opposite sides of the said orifice, a differential pressure gage having connections near to and on each side of the said orifice and means for causing the pressure difference acting on the said differential gage to bear a predetermined ratio other than unity to the said difference in pressure between the gases on opposite sides of the said orifice.

8. A meter for gases comprising a chamber, a permanently open orifice therein smaller than the said chamber and through which the gases pass, a U tube manometer containing a liquid with the upper end of one leg of the tube connected to the said chamber on one side of the said orifice and the upper end of the other leg of the tube connected to the said chamber on the other side of the said orifice, and a shortcircuiting passage of predetermined effect between the said upper ends of the U tube adapted to be open in parallel with the passage through said chamber during the operation of the meter.

9. A meter for gases comprising a chamber, a permanently open orifice therein smaller than the said chamber and through which the gases pass, a U tube manometer containing a liquid, a connection between the upper end of one leg of the U tube and the said chamber on one side of the said orifice, a connection between the upper end of the other leg of the U tube and the said chamber on the other side of the said orifice, a shortcircuiting passage of predetermined effect between the said connections, adapted to be open in parallel with the passage through said chamber during the operation of the meter, and means for varying the shortcircuiting effect of the said passage.

Signed at New York city in the county of New York and State of New York this 12th day of December, 1914.

GEORGE HALE BARRUS.

Witnesses:
A. I. MILLER,
CHAS. M. MANLY.